(12) United States Patent
Xu

(10) Patent No.: US 8,144,620 B2
(45) Date of Patent: Mar. 27, 2012

(54) METHOD AND SYSTEM FOR IMPLEMENTING NETWORK CONNECTION SERVICE

(75) Inventor: Yongliang Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 505 days.

(21) Appl. No.: 12/094,663

(22) PCT Filed: Nov. 14, 2006

(86) PCT No.: PCT/CN2006/003057
§ 371 (c)(1),
(2), (4) Date: May 22, 2008

(87) PCT Pub. No.: WO2007/059695
PCT Pub. Date: May 31, 2007

(65) Prior Publication Data
US 2008/0273473 A1    Nov. 6, 2008

(30) Foreign Application Priority Data
Nov. 24, 2005  (CN) .......................... 2005 1 0101835

(51) Int. Cl.
*H04L 12/28* (2006.01)
*H04L 12/56* (2006.01)
(52) U.S. Cl. ........ 370/254; 370/255; 370/357; 370/399; 709/227; 709/228; 709/236
(58) Field of Classification Search .................. 370/254, 370/255, 357, 393, 399, 395.53; 709/227–228, 709/236, 244
See application file for complete search history.

(56) References Cited

U.S. PATENT DOCUMENTS 5,825,772 A * 10/1998 Dobbins et al. ............... 370/396
6,249,576 B1    6/2001 Sassin et al.
(Continued)

FOREIGN PATENT DOCUMENTS

CN    1394036 A    1/2003
(Continued)

OTHER PUBLICATIONS

Ashwood-Smith et al., "Generalized Multi-Protocol Label Switching (GMPLS) Signaling Constraint-based Routed Label Distribution Protocol (CR-LDP) Extensions," The Internet Society Network Working Group, Request for Comments 3472, 1-23 (Jan. 2003).

(Continued)

*Primary Examiner* — Aung S Moe
*Assistant Examiner* — Benjamin H Elliott, IV
(74) *Attorney, Agent, or Firm* — Leyig, Voit & Mayer, Ltd.

(57) ABSTRACT

A method and system for implementing a network connection service is provided. In the invention, the port information of the network ingress node and the network egress node is registered with the directory server or configured manually. During the establishment of the network service connection, a request for establishing the network connection service between the source user node and the destination user node is initiated, and the directory server is queried in response to the request to obtain the connection and adaptation mode for establishing the network connection service, which is supported by both the network ingress node and the network egress node, and the network connection is established and the adaptation configuration is performed according to the connection and adaptation mode to establish the network connection service.

7 Claims, 3 Drawing Sheets

U.S. PATENT DOCUMENTS

| | | | |
|---|---|---|---|
| 6,741,585 B1 | 5/2004 | Munoz et al. | |
| 6,985,488 B2 * | 1/2006 | Pan et al. | 370/395.3 |
| 7,031,256 B2 * | 4/2006 | Hamlin et al. | 370/230 |
| 7,372,870 B2 * | 5/2008 | Huang et al. | 370/466 |
| 7,417,950 B2 * | 8/2008 | Hofmeister et al. | 370/230 |
| 7,492,763 B1 * | 2/2009 | Alexander, Jr. | 370/389 |
| 7,577,117 B2 * | 8/2009 | Cho et al. | 370/329 |
| 2001/0012271 A1 * | 8/2001 | Berger | 370/230 |
| 2003/0167341 A1 * | 9/2003 | Hayashi et al. | 709/238 |
| 2003/0169765 A1 | 9/2003 | Grammel | |
| 2004/0076168 A1 * | 4/2004 | Patenaude | 370/406 |
| 2004/0184441 A1 | 9/2004 | Wu et al. | |
| 2004/0184803 A1 * | 9/2004 | Chang et al. | 398/58 |
| 2005/0068890 A1 * | 3/2005 | Ellis et al. | 370/229 |
| 2005/0073955 A1 * | 4/2005 | MacLean et al. | 370/235 |
| 2005/0096016 A1 * | 5/2005 | Tervo et al. | 455/414.1 |
| 2005/0141042 A1 * | 6/2005 | Kawasaki et al. | 358/402 |
| 2005/0141567 A1 * | 6/2005 | Jaber et al. | 370/537 |
| 2005/0226424 A1 * | 10/2005 | Takata et al. | 380/279 |
| 2005/0238049 A1 * | 10/2005 | Delregno | 370/466 |
| 2008/0008184 A1 * | 1/2008 | Hayashi et al. | 370/392 |
| 2008/0189426 A1 * | 8/2008 | Xu | 709/227 |
| 2008/0259795 A1 * | 10/2008 | Fiaschi et al. | 370/232 |
| 2008/0273473 A1 * | 11/2008 | Xu | 370/255 |

FOREIGN PATENT DOCUMENTS

| | | |
|---|---|---|
| CN | 1444360 A | 9/2003 |
| CN | 1638387 A | 7/2005 |
| CN | 1681238 A | 10/2005 |
| CN | 1859369 A | 11/2006 |
| EP | 1 343 274 A2 | 2/2003 |
| EP | 1343274 A2 * | 9/2003 |
| EP | 1370044 A2 | 12/2003 |
| EP | 1 460 808 A2 | 3/2004 |
| WO | WO 00/70885 A1 | 11/2000 |
| WO | WO 03/056776 A1 | 7/2003 |

OTHER PUBLICATIONS

Berger et al., "Generalized Multi-Protocol Label Switching (GMPLS) Signaling Resource ReserVation Protocol-Traffic Engineering (RSVP-TE) Extensions," The Internet Society Network Working Group, Request for Comments 3473, 1-42 (Jan. 2003).

European Patent Office, Notice of Opposition in European Patent No. 1953963 (Jun. 30, 2010).

International Telecommunications Union, "Series G: Transmission systems and media, digital systems and networks; Series Y: Global information infrastructure and internet protocol aspects," ITU-T Recommendation G.7712/Y.1703 (Mar. 2003).

State Intellectual Property Office of the People'S Republic of China, Written Opinion of the International Searching Authority in International Patent Application No. PCT/CN2006/003057 ()Mar. 15, 2007).

State Intellectual Property Office of the People'S Republic of China, Examination Report in Chinese Patent Application No. 200510108357 (Jul. 27, 2007).

Wahl et al., "Lightweight Directory Access Protocol (v3)," The Internet Society Network Working Group, Request for Comments 2251, 1-50 (Dec. 1997).

* cited by examiner

METHOD AND SYSTEM FOR IMPLEMENTING NETWORK CONNECTION SERVICE

CROSS-REFERENCE TO RELATED APPLICATIONS

This application is a national phase of International Patent Application No. PCT/CN2006/003057, filed Nov. 14, 2006, which claims priority to Chinese Patent Application No. 200510101835.7, entitled "Method and System for Establishing Network Connection Service Based on Directory Service" and filed with the Chinese Patent Office on Nov. 24, 2005, both of which are hereby incorporated by reference in their entirety.

FIELD OF THE INVENTION

The present invention relates to the field of network communication technologies and in particular to a method and system for implementing a network connection service.

BACKGROUND OF THE INVENTION

With the rapid development of data services such as Internet, new requirements have been presented continuously on a transport network. The multi-services transport network enables the transition of the transport networks from the transport of predominant voice services to the transport of predominant data services plus voice services. Services supported over the transport network, typically referred to as a user side (or a branch side) include the Ethernet, the Asynchronous Transfer Mode (ATM), and the Frame Relay, in addition to the Plesiochronous Digital Hierarchy (PDH) which supports data services and the Synchronous Digital Hierarchy (SDH) which supports voice services. Ethernet services are the most popular services among these emerging data services. A line side of the transport network includes the above SDH including a high-order channel layer (VC-4 or VC-3, where VC stands for Virtual Container) and a low-order channel layer (VC-12 or VC-11); Optical Digital Unit (ODU) switching and wavelength switching of the Optical Transport Network (OTN) which is wavelength-oriented downward; and Multi-protocol Label Switching (MPLS) which is data-oriented upward. A transport node in the transport network includes one or more line-side ports, and a reliable transport from a plurality transport channels to a line is implemented through multiplexing and de-multiplexing. One or more branch units may be responsible for connection with a service signal at a client layer and one or more cross connection modules are responsible for establishing a cross connection between a branch interface and a line interface and between line interfaces, thereby implementing the establishment of an end-to-end network connection service. Origin and termination of the network connection service need to connect various user-side services to a network connection through an adaptor to accomplish a transport of a branch signal.

An existing mechanism of establishing an end-to-end connection for a network connection service generally includes the following steps regardless of establishing a Permanent Connection (PC) through a network management system or establishing a Soft Permanent Connection (SPC) over a control plane of an Automatic Switching Optical Network (ASON) of the ITU-T.

Firstly, a management plane selects the type and the number of network connections for user-side services and further selects an adaptation stack from the network connections to the user-side services.

Then, the management plane establishes cross connections with respective network nodes one by one to establish the network connections if the network connections are permanent or the network management system instructs the control plane to establish automatically the network connections if the network connections are soft permanent.

Finally, the management plane adapts the user-side services to the network connections for an ingress node and an egress node of the network.

As can be seen from above, the following drawbacks are present in the prior art. Manual configuration has to be required to adapt the user-side services to the network connections in the last step, and this may introduce a delay of establishing the network connections, and it may be difficult to track and remove a failure due to a configuration error in the case of a large number of services. Furthermore, the existing technology standard of establishing a Switched Connection (SC) via a User Network Interface (UNI) is only limited to an establishment of a simple connection over a transport network with a single switching capability, such as an end-to-end connection of VC-4/VC-3, but it may not be satisfactory for triggering an automatic establishment of the end-to-end service through a user network interface or network management system over a multi-service transport network integrated with a plurality of switching capabilities.

SUMMARY OF THE INVENTION

Embodiments of the invention provide a method and system for implementing a network connection service to automatically establish the network connection service over a multi-service transport network.

An embodiment of the invention provides a method for implementing a network connection service, including:

initiating a request for establishing a network connection service between a source user node and a destination user node;

querying a directory server in response to the request to obtain a connection and adaptation mode supported by a network ingress node and a network egress node for establishing the network connection service; and establishing a network connection and performing an adaptation configuration according to the connection and adaptation mode to implement the network connection service.

Preferably, the request is initiated from the source user node or is initiated from a network management system to the network ingress node.

Preferably, when the request is initiated from the user node, obtaining the connection and adaptation mode includes:

parsing, by the network ingress node, the request, and querying the directory server according to a parsing result to obtain a set of connection and adaptation modes of the network egress node, which support the network connection service;

obtaining, by the network ingress node, a set of connection and adaptation modes of the network ingress node, which support the network connection service, based on a locally stored value or by querying the directory server;

intersecting, by the network ingress node, two obtained sets to obtain a new set of connection and adaptation modes supported by both of the ingress node and the egress node, and selecting one from the new set as a connection and adaptation mode of the network connection service; and registering, by the network ingress node, with the directory server selected connection and adaptation mode which supports the network connection service.

Preferably, establishing the network connection and performing the adaptation configuration to implement the network connection service includes:

sending, by the network ingress node, to the network egress node the request for establishing the network connection service;

querying, by the network egress node, the directory server in response to the request to obtain the connection and adaptation mode which supports the network connection service, and forwarding the request to the destination user node;

returning, by the destination user node, an acknowledgement message to the network ingress node through the network egress node upon receiving the request;

establishing, by the network ingress node, the network connection according to the connection and adaptation mode which supports the network connection service to bear the network connection service upon receiving the acknowledgement message;

sending, by the network ingress node, to the network egress node a message for notifying that the network service is established; and notifying, by the network egress node, the destination user node and the source user node that the network service is established upon receiving the message.

Preferably, when the request is initiated from the network management system, obtaining the connection and adaptation mode includes:

parsing, by the network management system, the request, and querying the directory server according to a parsing result to obtain a set of connection and adaptation modes of the network ingress node and a set of connection and adaptation modes of the network egress node, both of which support the network connection service; and intersecting, by the network management system, two sets to obtain a new set of connection and adaptation modes supported by the network egress node and the network ingress node, and selecting one from the new set as a connection and adaptation mode of the network connection service.

The network ingress node and the network egress node establish the network connection according to the connection and adaptation mode selected, and the network management system sends configuration commands directly to the network ingress node and the network egress node to establish the network connection service.

Before initiating the network connection service request, port information of the network ingress node and the network egress node is registered with or configured in the directory server.

The request carries the port information of the network ingress node and the port information of the network egress node;

the port information includes a key including a Transport Network Assigned (TNA) address and a value including a node identifier, a port identifier and a set of connection and adaptation modes; and the connection and adaptation mode includes a connection type and a sequence of sub-network points acting as an origin or termination for subsequent connection establishment.

The key further includes a sub-port address;

the value further includes a sub-port identifier; and the connection and adaptation mode further includes adaptation protocol types, virtual concatenations and link capacity adjustment scheme of respective layers of an adaptation.

An embodiment of the invention further provides a system for implementing a network connection service including at least one means for establishing a network connection service, and the system further includes:

a directory server, connected with the means for establishing the network connection service, configured to store port information of a network ingress node and a network egress node; and the means for establishing the network connection service is configured to register the port information of the network ingress node and the network egress node with the directory server and to query the directory server to obtain required port information comprising a connection and adaptation mode which supports the network connection service.

Preferably, the means for establishing the network connection service includes:

at least one user interface module configured to support an access of a user signal;

at least one line interface module configured to support a connection between network nodes;

at least one cross connection module configured to implement a software controllable connection switching function between the user interface module and the line interface module, between different user interface modules, between different line interface modules and between different cross connection modules; and a control module configured to run a control protocol software and to communicate with a network management system, the directory server and other nodes over a data communication network to control the user interface module, the line interface module and the cross connection module to establish the network connection service.

Preferably, the cross connection module is a MPLS cross module or a Synchronous Digital Hierarchy virtual container cross module;

the user interface module is an Ethernet user interface module; and the line interface module is a Synchronous Digital Hierarchy line interface module.

In summary, in order to address the problem in the prior art that the manual configuration may introduce a time delay and cause a difficulty in removing a fault, in the invention, the port information of the network ingress node and the network egress node is registered with the directory server or configured manually; during the establishment of the network service connection, a request for establishing the network connection service between the source user node and the destination user node is initiated, and the directory server is queried in response to the request to obtain the connection and adaptation mode for establishing the network connection service, which is supported by both the network ingress node and the network egress node, and the network connection is established and the adaptation configuration is performed according to the connection and adaptation mode to establish the network connection service.

The invention enables an automatic establishment of the network connection service over a multi-service transport network integrated with a plurality of switching capabilities based upon a directory service, so that the human intervention is reduced, and the difficulty in tracking and removing a fault due to the configuration error caused by the human intervention may be alleviated, the time delay of the network connection establishment may be decreased and the operation efficiency may be improved.

BRIEF DESCRIPTION OF THE DRAWINGS

The invention is further described below by reference to the embodiments thereof and the drawings in which.

DETAILED DESCRIPTION OF THE INVENTION

Figure 1:
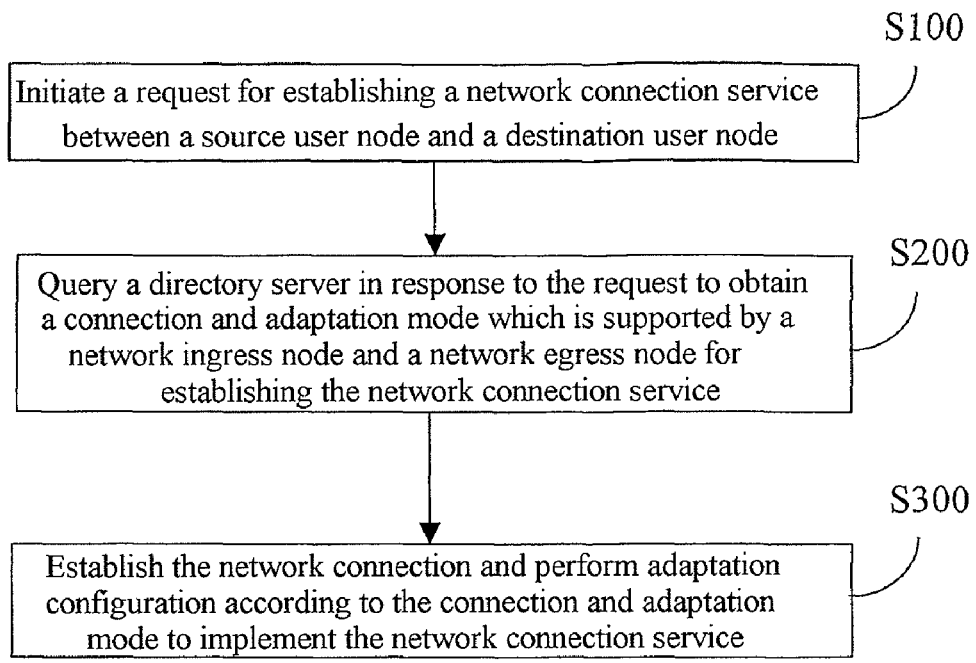
FIG. 1 is a flow chart of the method for implementing a network connection service based upon a directory service according to an embodiment of the invention.

The flow chart of the method for establishing a network connection service based upon a directory service according to the invention is as illustrated in FIG. 1. The method includes the following steps.

In the step S100, a network management system or user node initiates a request for establishing a network connection service between a source user node and a destination user node.

In the step S200, the directory server is queried in response to the request to obtain a connection and adaptation mode required for establishing the network connection service and supported by both a network ingress node and a network egress node.

In the step S300, based on the connection and adaptation mode, the network connection is established and the adaptation configuration is implemented to establish the network connection service.

The directory service in the invention refers to a "key-value" based information storage and query mechanism. For example, a Domain Name System (DNS) of the Internet is a directory service based application in which conversion between a domain name and an IP address is implemented easily through the directory service. A network application can register information in the directory server and query the information from the directory server via a dedicated interface. The lightweight directory access protocol v3 in the IETF RFC2251 specification is a standard directory access protocol.

Figure 2:
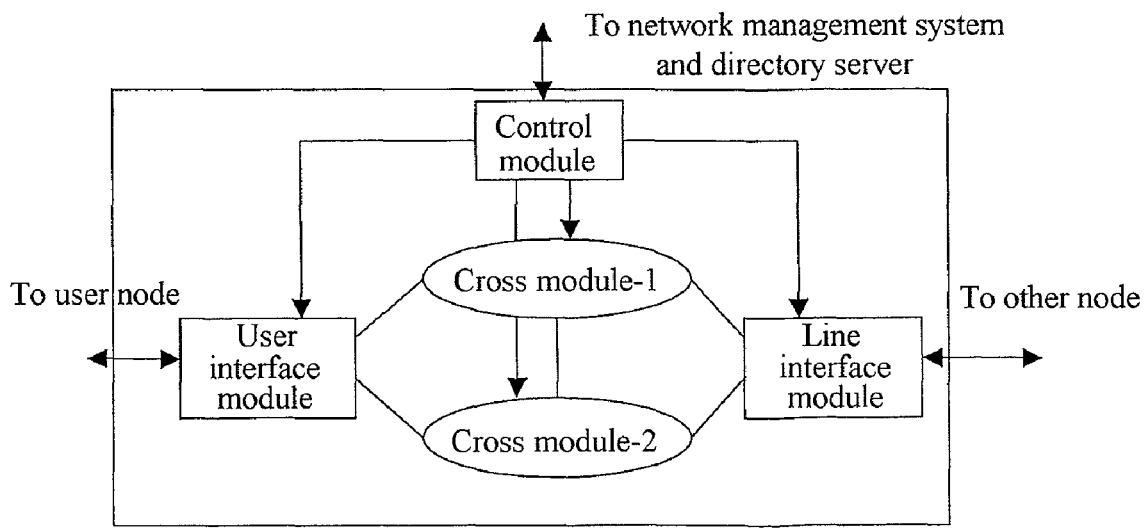
FIG. 2 is a principle diagram of the system for implementing a network connection service based upon a directory service according to an embodiment of the invention.

A principle of the system for establishing a network connection service based upon a directory service according to the invention is as illustrated in FIG. 2. As be seen from the FIG. 2, the system includes: at least one user interface module configured to support an access of a client signal; at least one line interface module configured to support a connection between network nodes; at least one cross connection module configured to implement a software controllable connection switching function between the user interface module and the line interface module, between different user interface modules, between different line interface modules and between different cross connection modules; at least one control module configured to run a control protocol software and communicate with a network management system and other nodes over a data communication network to control the user interface module, the line interface module and the cross connection module to establish a network connection service; and a directory server, communicatively connected with the control module, configured to store port information of a network ingress node and a network egress node which are registered automatically or configured manually.

An embodiment of establishing an Ethernet service over a multi-service transport network is described and it shall be noted that other services (such as PDH, SDH, ATM and FR) may be transported in the same service establishment process except for different network connections and adaptation stacks.

Figure 3:
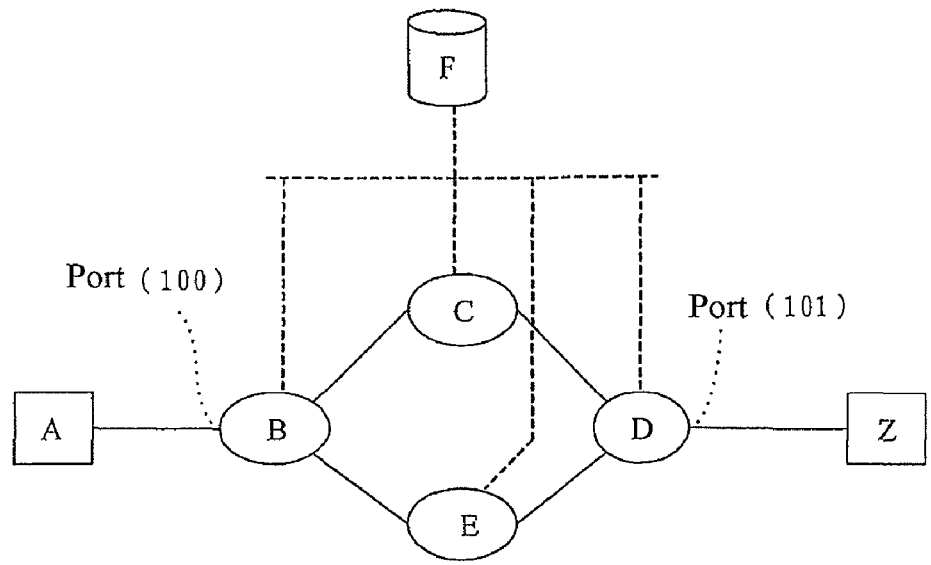
FIG. 3 is a diagram illustrating an Ethernet transport network according to an embodiment of the invention.

FIG. 3 illustrates an instance of providing an Ethernet service over a transport network in which network nodes A and Z are the source and the destination of user ends of an Ethernet service respectively, the network nodes B, C, D and E are multi-service transport nodes (where the network node B is an ingress node of the network and the network node D is an egress node of the network) which are connected through Time Division Multiplex (TDM) lines such as SDH links, and the node F is a directory server.

Figure 4:
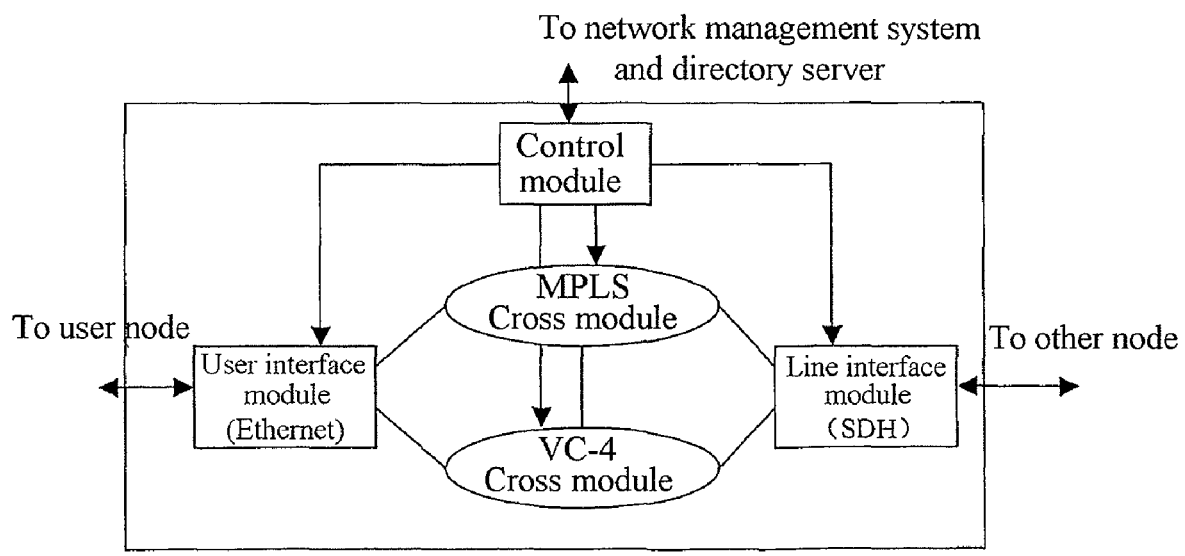
FIG. 4 is a structural diagram of a multi-service transport network node according to an embodiment of the invention.

The structure of transport nodes B, C, D and E are as illustrated in FIG. 4. FIG. 4 shows an embodiment of the system according to the invention, including an Ethernet user interface module (which is one of user interface modules), an MPLS cross module, a VC-4 (Virtual Container-4) cross module, an SDH line interface module (which is one of line interface modules) and a control module. The MPLS cross module and the VC-4 cross module are two of cross connection modules. The Ethernet user interface module includes at least one user port and the SDH line interface module also includes at least one line port. The control module runs Generalized Multi-Protocol Label Switching (GMPLS) and other control plane protocols and communicates with a network management system and other nodes via a data communication network to control other modules to establish and maintain a service. The data communication network typically based upon a TCP/IP protocol stack is borne over an SDH line overhead, such as a point-to-point (PPP) link consisted of D1-D3 and D4-D12 bytes, or over a dedicated communication link such as the Ethernet. The related information is disclosed in ITU-T Recommendation G.7712. The data communication network is only used for communication of management and signaling messages between the network nodes and between the network node and the network management system or the directory server.

Figure 5:
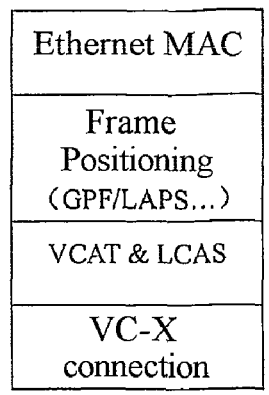
FIG. 5 is a structural diagram of an adaptation hierarchy for transport over the SDH according to an embodiment of the invention.

If the network ingress node B and the network egress node D of the Ethernet service in this embodiment selects the VC-4 virtual concatenation for transportation, the Ethernet needs to be mapped to an SDH Virtual Container (VC), and the following network connections and adaptation stack are included (see FIG. 5).

(1) An Ethernet MAC layer, which may include a process over a Virtual Local Area Network (VLAN).

(2) A framing protocol layer, which primarily accomplishes functions of packet encapsulation, framing, rate adaptation and so on. In particularly, the function includes the Generic Framing Procedure (GFP) of the ITU-T, the Link Access Procedure for SDH (LAPS), the Ethernet over SDH (EOS), the Packet over SDH (PoS). For a specific framing protocol (e.g., the GFP), a protocol number needs to be determined for use.

(3) Virtual Concatenation (VCAT) which primarily accomplishes a procedure of mapping a high speed user-side signal to a plurality of low speed network-side transport channels. The plurality of low speed network-side transport channels constitutes a set of transport channels referred to a Virtual Concatenation Group (VCG) and may be transported over different paths. Typically, Link Capacity Adjustment Scheme (LCAS) and the Virtual Concatenation (VCAT) cooperate to provide a dynamic transport bandwidth adjustment as well as an automatic bandwidth adjustment in the case of a network connection failure. Whether to use the VCAT is optional, and whether to enable the LCAS is also optional when the VCAT is in use.

(4) A network connection layer where a network connection in an SDH network has a high-order channel virtual container including VC-4 or VC-3, a low-order channel including VC-12 or VC-11, and standard concentrations of the signals including VC-4-4c or VC-3-4c.

In order to transport an Ethernet service from the source to the destination, the network ingress node B and the network egress node D are consistent in terms of an adaptation stack of the Ethernet and a granularity of a network borne connection. The following three connection ways may be used, and the corresponding adaptation stacks are as follows.

(1) Ethernet/GFP/VCAT/VC-x, x=4, 3, 12 or 11. The Ethernet service is GFP encapsulated and then is borne in a VCG which can be borne in a plurality of VC-X on different paths. The LCAS cooperates with the VCAT to enable a dynamic bandwidth adjustment. The VCAT as referred to here is an adaptation mode to transport a high speed user-side signal (such as an Ethernet signal) over a plurality of low speed line-side connections which pass different transport paths, in an SDH or OTN network, (2) Ethernet/GFP/ODUk, k=1 to 3. The Ethernet service is GFP encapsulated and then is borne onto an OTN ODUk sub-wavelength channel.

(3) Ethernet/PWE3/MPLS LSP. The Ethernet service is encapsulated through Pseudo Wire Emulation Edge to Edge (PWE3) and then is borne onto a label switched connection of an MPLS network.

According to the invention, a network connection and adaptation configuration procedure is implemented by registering with and querying a directory server. This procedure is described in an embodiment of establishing an Ethernet service between the source A and the destination Z as illustrated in FIG. 3. It shall be noted that the message transport between the network nodes will be enabled over a dedicated signaling network and this signaling procedure is implemented by the GMPLS technology of the Internet Engineer Task Force (IETF).

Figure 6:
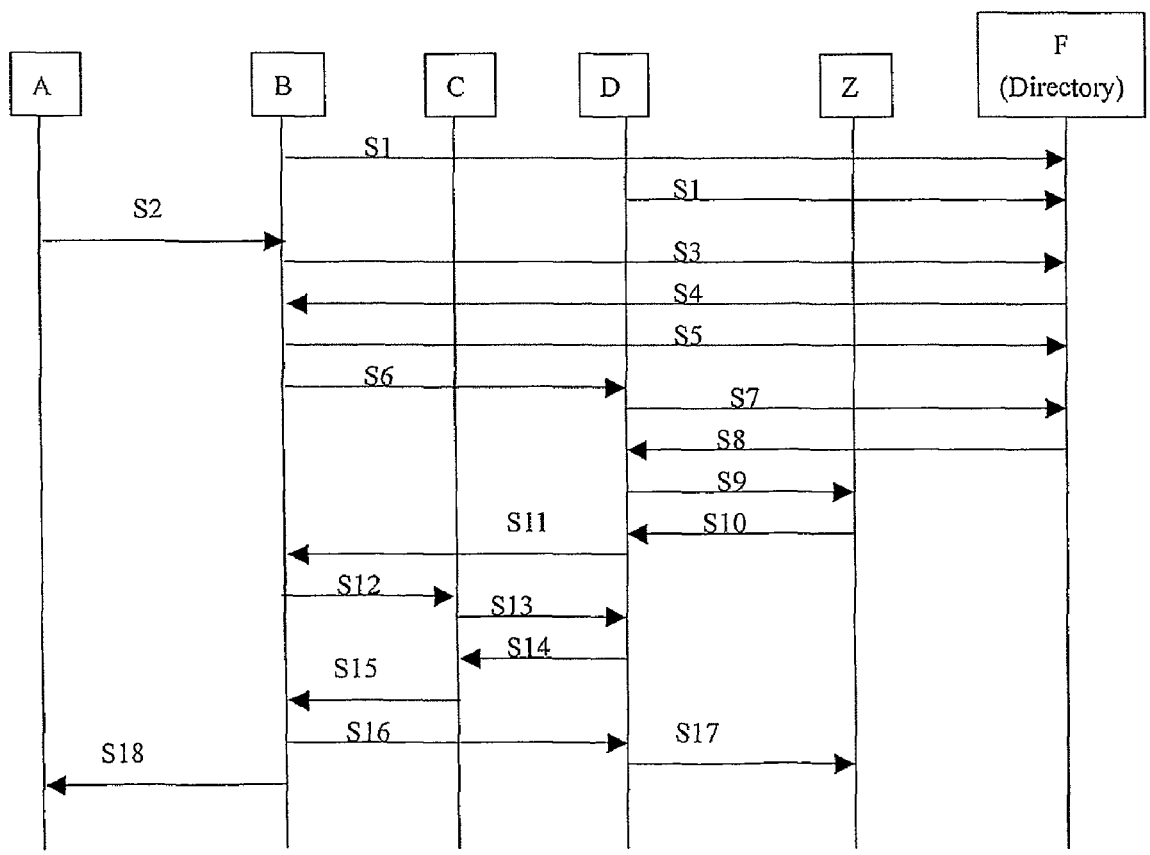
FIG. 6 is a time sequence diagram of establishing an Ethernet service according to an embodiment of the invention.

As illustrated in FIG. 6, in the step S1, the network ingress node B connected with the user node A registers port information of the network ingress node B with the directory server F, and the network egress node D connected with the user node Z registers port information of the network egress node D with the directory server F. Alternatively, the directory server may be manually configured with the port information of the network ingress node and the network egress node. The port information represented with a TNA address includes a key and a value. The key consists of the TNA address and an optional sub-port address. Particularly, the TNA address is an identifier for a connection link of the user node, and the identifier is assigned by the network and is unique in the network. The sub-port address is a subdivision in the case that the link is multiplexed. Contents of the value corresponding to the key includes a node ID, a port ID, an optional sub-port ID and a set of available connection and adaptation modes. The set of available connection and adaptation modes includes at least one connection and adaptation mode possibly configured with a priority. The connection and adaptation mode includes the adaptation protocol types of the respective layers of the above optional adaptations (as shown in FIG. 5), the optional VCAT and LCAS, a sequence of sub-network points connected with an adaptor. The sequence of sub-network points acts as an origin or termination for subsequent connection establishment.

In the step S2, the source user node A requests the network ingress node B for establishing a Gigabit Ethernet (GE) connection from the source user node A to the destination user node Z. Superficially, the request for establishing a network connection service may be issued through a UNI or the network management system, and the request includes the source TNA address (100), the destination TNA address (101), the service type (GE), the bandwidth (1000 Mbps) and a protection attribute (Unprotected).

In the step S3, the network ingress node B parses the above request information and queries the directory server F with the destination TNA address (101) parsed.

In the step S4, the directory server F queries an associated value with the destination TNA address (101) as a key and returns to the network ingress node B the value corresponding to the TNA address; the value includes the destination user node ID (D), the destination port address (101) and the set of connection and adaptation modes; the set of connection and adaptation modes includes the GFP over VC-4-Xv, X=1 to 7, and corresponding sequence of seven sub-network points (SNP1, SNP2 . . . SNP7).

In the step S5, the network ingress node B receives the destination TNA address (101) and the information of the corresponding value from the directory server F. A value corresponding to the source TNA address (100) may be obtained by querying the directory server F or be obtained from a locally stored value and includes the source user node ID (A), the source port address (100) and the set of connection and adaptation modes. In the present embodiment, the first set is GFP/VC-4-Xv, X=1 to 7, corresponding to a sequence of seven sub-network points SNP1, SNP2 . . . SNP7, and the second set is GFP over VC-4-Xc, X=1, 4 or 8, corresponding to a sequence of one sub-network point SNP8.

An intersection of the sets of connection and adaptation modes obtained in the step S4 and in the step S5 results in one or more network connection and adaptation modes supported by both of the nodes. If the number of the network connection and adaptation modes supported by both of the nodes is more than one, the network connection and adaptation mode with the highest priority is selected. However, if the service fails to be established with this connection and adaptation mode due to an insufficient resource or other reasons, then other modes with other priorities may also be tried, thereby improving a probability of successfully establishing the service. If the intersection includes no connection and adaptation mode supported by both of the nodes, then the network ingress node B returns error information to the source user node A and the service request ends with failure. The connection and adaptation modes supported by both of the nodes in this embodiment includes GFP over VC-4-7v corresponding to network connections of <A: SNP1, D: SNP1>, <A: SNP2, D: SNP2> . . . <A: SNP7, D: SNP7>.

The network ingress node B further registers the connection and adaptation mode selected for the service with the directory server F, and the key of the registered information includes the source TNA address (100), the destination TNA address (101) and optionally the source sub-port address and the destination sub-port address. The value of the registered information includes adaptation information and connection type information of respective layers (such as GFP over VC-4-7v) and network connections between the source and the destination, which support the service connection (<A: SNP1, D: SNP1>, <A: SNP2, D: SNP2> . . . <A: SNP7, D: SNP7>).

In the step S6, the network ingress node B forwards the user service request information i.e. the request information in the step S2 to the network egress node D.

In the step S7, the network egress node D receives the request forwarded from the network ingress node B, obtains the TNA addresses of the source and the destination of the service from the request information, and queries the directory server F with the TNA addresses about the connection and adaptation mode of the service.

In the step S8, the directory server F returns to the network egress node D the information on the connection and adaptation mode of the service in query i.e. the query information returned from the directory server F to the network ingress node B in the step S4.

In the step S9, the network egress node D forwards the request message to the destination user node Z.

In the step S10, the destination user node Z checks and accepts the request and then returns an acknowledgement message to the network egress node D.

In the step S11, the network egress node D receives and returns the acknowledgement message to the network ingress node B.

In the steps S12 to S15, the network ingress node B receives the acknowledgement message from the network egress node D and then queries the directory server to obtain the network connections between the source and the destination which support the service connection, in other words, to establish connections between the seven pairs of sub-network points <A: SNP1, D: SNP1>, <A: SNP2, D: SNP2> ... <A: SNP7, D: SNP7>. Establishment of a connection is accomplished via a distributed signaling process which is repeated until all the connections have been established. Then the seven pairs of sub-network points at the present end are added sequentially into the VCG of VC-4-7v, and finally necessary GFP configuration is performed on the VCG to bear the Ethernet service.

In the step S16, the network ingress node B sends to the network egress node D a message to notify that the service is established.

In the step S17, the network egress node D receives the message and notifies the destination user node Z that the service is established.

In the step S18, the node notifies the source client node A that the service is established.

Among the above steps, except that the steps S12 to S15 belong to I-NNI or E-NNI signaling, other steps belong to UNI signaling. The UNI signaling specification is disclosed in the OIF UNI 1.0 specification (the optical UNI 1.0 specification is disclosed in "User Network Interface (UNI) 1.0 Signaling Specification", Optical Internet Forum). The E-NNI signaling specification is disclosed in the OIF E-NNI specification (the Intra-Carrier E-NNI Signaling Specification). The I-NNI signaling is disclosed in the IETF RFC3473. All these signaling protocols used for an interface may adopt the Resource reSerVe Protocol with Traffic Engineering extension (RSVP-TER) (the IETF RFC3473 may be made reference to for details thereof) or the Constrained-Routing Label Distribution Protocol (CR-LDP) (the IETF RFC3472 protocol may be made reference to for details thereof).

The process in the step S1 in which the network nodes register the port information with the directory server is optional. Alternatively, the directory server may be directly configured with the information through the network management system or another management tools.

The above steps are a UNI request based signaling procedure initiated from a user equipment or a user equipment proxy, and a network service established in this way is referred to as a Switched Connection (SC) service.

If the service establishment request is initiated from the network management system, then a service established in this way is referred to as a Soft Permanent Connection (SPC) service. The difference between the establishment of SPC and the above steps are as follows.

(1) The request in the step S2 is initiated from the network management system.

(2) In steps S3 to S5, the network management system queries the directory server F about the information of the values corresponding to the TNA addresses of the source and the destination and so on, selects one connection and adaptation mode from the intersection of the connection and adaptation modes supported respectively by the source and the destination as the mode to be used, and obtains the information of adaptations of respective layers and the connection type as well as the information of the pair of source and destination SNIP addresses supporting the connection of the service.

(3) The steps S6 to S11 are unnecessary because the service establishment request is from the network management system in a trusted relationship with the network devices. Thus, the check process is not required.

(4) In the steps S12 to S15, no change arises to the establishment of the connection for the service except that the network management system sends configuration commands directly to the network ingress node B and the network egress node D to accomplish the establishment of the VCG, addition of a member link and GFP configuration.

(5) The steps S16 to S18 are unnecessary.

The above embodiments are provided to illustrate and describe the principle of the invention. As can be appreciated, the embodiments of the invention will not be limited thereto. It will be evident to those skilled in the art that various modifications and variations made without departing from the spirit and scope of the invention shall come into the scope of the appended claims.

The invention claimed is:

1. A method for implementing a network connection service, comprising:
    initiating a request for establishing a network connection service between a source user node and a destination user nodded, wherein the request is initiated from the source user node to a network ingress node;
    parsing, by the network ingress node, the request, and querying a directory server according to a parsing result to obtain a set of connection and adaptation modes of a network egress node, which support the network connection service;
    obtaining, by the network ingress node, a set of connection and adaptation modes of the network ingress node, which support the network connection service, based on a locally stored value or by querying the directory server;
    intersecting, by the network ingress node, two obtained sets to obtain a new set of connection and adaptation modes supported by both of the network ingress node and the network egress node, and selecting one from the new set as a connection and adaptation mode of the network connection service;
    registering, by the network ingress node, with the directory server selected connection and adaptation mode which supports the network connection service; and establishing a network connection and performing an adaptation configuration according to the connection and adaptation mode to implement the network connection service.

2. The method according to claim 1, wherein establishing the network connection and performing the adaptation configuration to implement the network connection service comprises:
   sending, by the network ingress node, to the network egress node the request for establishing the network connection service;
   querying, by the network egress node, the directory server in response to the request to obtain the connection and adaptation mode which supports the network connection service, and forwarding the request to the destination user node;
   returning, by the destination user node, an acknowledgement message to the network ingress node through the network egress node upon receiving the request;
   establishing, by the network ingress node, the network connection according to the connection and adaptation mode which supports the network connection service to bear the network connection service upon receiving the acknowledgement message;
   sending, by the network ingress node, to the network egress node a message for notifying that the network service is established; and
   notifying, by the network egress node, the destination user node and the source user node that the network service is established upon receiving the message.

3. A method for implementing a network connection service, comprising:
   initiating a request for establishing a network connection service between a source user node and a destination user nodded, wherein the request is initiated from a network management system to the network ingress node;
   parsing, by the network management system, the request, and querying a directory server according to a parsing result to obtain a set of connection and adaptation modes of a network ingress node and a set of connection and adaptation modes of a network egress node, both of which support the network connection service; and
   intersecting, by the network management system, two sets to obtain a new set of connection and adaptation modes supported by the network egress node and the network ingress node, and selecting one from the new set as a connection and adaptation mode of the network connection service,
   establishing a network connection and performing an adaptation configuration according to the connection and adaptation mode to implement the network connection service.

4. The method according to claim 3, wherein the network ingress node and the network egress node establish the network connection according to the connection and adaptation mode selected, and the network management system sends configuration commands directly to the network ingress node and the network egress node to establish the network connection service.

5. The method according to claim 3, wherein before initiating the network connection service request, port information of the network ingress node and the network egress node is registered with or configured in the directory server.

6. A method for implementing a network connection service, comprising:
   initiating a request for establishing a network connection service between a source user node and a destination user node;
   querying a directory server in response to the request to obtain a connection and adaptation mode supported by a network ingress node and a network egress node for establishing the network connection service; and
   establishing a network connection and performing an adaptation configuration according to the connection and adaptation mode to implement the network connection service;
   wherein before initiating the network connection service request, port information of the network ingress node and the network egress node is registered with or configured in the directory server;
   wherein:
   the request carries the port information of the network ingress node and the port information of the network egress node;
   the port information comprises a key comprising a Transport Network Assigned address and a value comprising a node identifier, a port identifier and a set of connection and adaptation modes; and
   the connection and adaptation mode comprises a connection type and a sequence of sub-network points acting as an origin or termination for subsequent connection establishment.

7. The method according to claim 6, wherein
   the key further comprises a sub-port address;
   the value further comprises a sub-port identifier; and
   the connection and adaptation mode further comprises adaptation protocol types, virtual concatenations and link capacity adjustment scheme of respective layers of an adaptation.

* * * * *